United States Patent [19]

Biddau et al.

[11] Patent Number: 5,227,568
[45] Date of Patent: Jul. 13, 1993

[54] PROCESS FOR TREATING EFFLUENTS ORIGINATING FROM THE PREPARATION OF HYDROCARBON RESINS

[75] Inventors: Gianfranco Biddau, Porto Torres; Oscar Cappellazzo, Alghero; Sergio E. Lai, Sassari; Giuseppe Messina, Alghero, all of Italy

[73] Assignee: Enimont Anic S.r.l., Palermo, Italy

[21] Appl. No.: 717,909

[22] Filed: Jun. 20, 1991

[30] Foreign Application Priority Data

Jun. 22, 1990 [IT] Italy ................. 20741 A/90

[51] Int. Cl.$^5$ ............................................. C07C 2/00
[52] U.S. Cl. .................... 585/700; 585/702; 585/469; 585/532
[58] Field of Search ............... 585/700, 702, 469, 532, 585/712, 713, 841, 850

[56] References Cited

U.S. PATENT DOCUMENTS 4,895,995  1/1990  James, Jr. et al. ................. 585/469

FOREIGN PATENT DOCUMENTS 0260001  3/1988  European Pat. Off. .
0368419  5/1990  European Pat. Off. .

Primary Examiner—Olik Chaudhuri
Assistant Examiner—C. Everhart
Attorney, Agent, or Firm—George P. Hoare, Jr.

[57] ABSTRACT

A process of hydrodechlorination of effluents originating from the preparation of hydrocarbon resins is described, the effluents consisting of about 90% of unconverted monomers and containing between 600 and 2500 ppm of organic chlorine. Said hydrodechlorination process comprises subjecting the said effluents to hydrogenation at a temperature of between 200° and 300° C. in the presence of a catalyst, preferably consisting of Ni-Mo supported on $\gamma$-$Al_2O_3$.

7 Claims, No Drawings

PROCESS FOR TREATING EFFLUENTS ORIGINATING FROM THE PREPARATION OF HYDROCARBON RESINS

This invention relates to a process for treating effluents originating from the preparation of hydrocarbon resins, the process consisting of bringing the effluent into contact with a hydrogenation catalyst in the presence of hydrogen under conditions such as to induce a hydrodechlorination reaction and generate a final product consisting mainly of saturated hydrocarbons substantially free of organic chlorine. Hydrocarbon resins are polymer synthesis products ranging from viscous liquids to hard fragile solids with an average molecular weight ranging from 300 to 2000, and are prepared by thermal catalytic polymerization of $C_5$ and higher hydrocarbon cuts, the by-products of steam cracking plants. These synthesis resins are used directly as an alternative to rosins of natural origin in numerous applications, such as adhesives, coatings, hot-melts and rubber and plastics additives, and in addition if subjected to structural modifications such as functionalization with polar groups can extend their use to other sectors such as varnishes, printing inks, emulsifiers etc. The catalytic polymerization of unsaturated hydrocarbon cuts to produce said resins is generally conducted in the presence of suitable cationic initiators pertaining mainly to the following two Lewis acid categories:

$AlCl_3$ and its derivatives ($AlCl_3+HCl$; $AlCl_3+H_2O$, etc,);

$BF_3$ and its derivatives.

Other Lewis acids such as $TiCl$, $SnCl_4$ and acid clays can in fact be used, but these latter initiators are generally limited to possible prepolymerization stages. In addition, $AlCl_3$-based initiators favour the formation of intramolecular cycles of linear diene monomers, and for equal conditions lead to the formation of more stable products with higher softening points. $AlCl_3$-based catalysts are mainly used in the resinification of $C_5$, $C_5+C_6$ and $C_5+$aromatic $C_9$ cuts. The polymerization of unsaturated hydrocarbons containing five or six carbon atoms or of mixtures of unsaturated hydrocarbons containing five carbon atoms and alkenylaromatic hydrocarbons containing nine carbon atoms, as contained in certain steam cracking cuts, is achieved by acid catalysis over a homogeneous catalyst of $AlCl_3$ type, preferably in a xylene solution, and is followed by hydrolytic and neutralizing washes. The separation of the obtained resin from the rest of the reaction crude comprising the solvent, low molecular weight oligomers, unsaturated products and unconverted substances, is usually achieved by flash pre-evaporation followed by thin film vacuum evaporation. The distillate is that which for the purposes of the present invention is identified by the term "effluents" and is characterised by an "organic chlorine" content which originates from the catalyst and is bonded to the unsaturated products during polymerization, and which is present in a quantity varying between 600 and 2500 ppm by weight, and most frequently exceeds 1500 ppm. This by-product always represents a problem in the industrial production of hydrocarbon resins because the presence of a considerable chlorine quantity makes it impossible to reuse as gasoline or as a feedstock for cracking, or to dispose of by combustion. The present invention therefore relates to a process for treating the aforesaid effluents, the treatment enabling them to be disposed of without any inconvenience to the surrounding environment, by transforming them into saturated $C_5$-$C_6$ mixtures or $C_5+$alkylaromatic $C_9$ mixtures and HCl, two by-products which can be easily recovered and, in the case of the saturated $C_5+C_6$ or $C_5+C_9$ cut, with the potential advantage of use as a solvent or gasoline or for recycling to the steam cracking process. Substantially, the process of the present invention consists of feeding the effluent stream from the separation stage of the hydrocarbon resins obtained by polymerization of $C_5$-$C_6$ or $C_5+$alkenil aromatic $C_9$ unsaturated products in the presence of $AlCl_3$-based catalysts on a hydrogenation catalyst, in the presence of hydrogen, at a temperature of between 200° and 400° C., to induce a hydrodechlorination reaction of the type

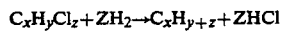

$$C_xH_yCl_z+ZH_2\rightarrow C_xH_{y+z}+ZHCl$$

with the consequent formation of hydrochloric acid and saturated products which, as described in detail hereinafter, can be easily separated by chemical or physicochemical methods.

In the process of the present invention the effluent is fed to the hydrogenation stage to enter into contact with a hydrogen-rich atmosphere and a hydrogenation catalyst. This can be chosen from a wide range of compounds, it consisting of a suitable mixture of metals supported on an oxide suitable for the purpose. Particularly suitable hydrogenation catalysts have proved to be those based on cobalt, molybdenum and nickel-molybdenum supported on gamma-alumina, and in particular the second. Other combinations can however be used in the process of the present invention, in which the metal constituent can be at least one metal chosen from those of Groups VIB and VIII of the periodic table of elements.

Catalyst compositions comprising one or more metals chosen from Mo, W, Cr, Fe, Co, Ni, Pt, Ir, Pd, Rh, Ru, supported on inert oxides such as preferably gamma-aluminium, are not therefore excluded from the implementation of the process of the present invention. The choice of catalyst is motivated mainly by process economy, in that each compound of those initially mentioned has proved suitable in terms of effecting the hydrodechlorination in accordance with the present invention. Thus catalysts consisting of Co-Mo and Ni-Mo metal pairs supported on $\gamma$-$Al_2O_3$ have proved particularly interesting, and in particular the second which demonstrates significant activity for a decidedly longer time. The catalysts used, being those commonly used in hydrotreating reactions, can be prepared by methods well known to the expert of the art.

They can also be chosen from commercially available types. For example the Ni-Mo on $\alpha$-$Al_2O_3$ catalyst G 88 of Sud Chemie and the Co-Mo catalyst of Akzo can be used.

The effluent hydrodechlorination according to the present invention is conducted at a temperature of between 200° and 400° C., preferably between 250° and 350° C., at a hydrogen pressure of between 5 and 50 atmospheres, and a spatial velocity of 0.1-10, the hydrogen quantity being such that the hydrogen/hydrocarbon molar ratio is between 1 and 10, and the catalyst preferably being preactivated, using methods well known to the expert of the art, for example by presulphuration [in which the reduction (hydrogen) and the sulphuration ($H_2S$, dimethyldisulphide, mercaptan or other sulphides) of the catalyst are effected simultaneously under controlled conditions]. The described hydrodechlorination results in a considerable reduction in organic chlorine, which in the final product is always less than 10 ppm. As stated, the final products consist of hydrochloric acid and saturated $C_5$-$C_6$ or $C_5$+alkylaromatic $C_9$ products, which can be separated by chemical and physico-chemical methods based essentially on neutralizing the hydrochloric acid by contact with an aqueous solution of an alkaline or alkaline earth compound or with solids such as activated aluminas, earths or molecular sieves, or again with alkaline and alkaline earth metals or metals of Groups I and IIB of the periodic system or mixtures thereof (such as $ZnCaO_2$).

EXAMPLE 1

The effluents from a hydrocarbon resin plant were previously distilled to separate the approximately 10% of oligomers present. The distillate within the temperature range of 0°-95° C., consisting of a mixture of saturated and unsaturated hydrocarbons of five and six carbon atoms and characterised by an organic chlorine content of about 1200 ppm by weight and a bromine number of 80 mg/100 g, is fed together with a hydrogen-rich gas stream into a hydrogenation reactor containing a nickel-molybdenum on $\gamma$-$Al_2O_3$ catalyst produced by Sud Chemie A. G. under the name of G 88 and previously activated by presulphuration using methods well known in industrial practice. The hydrogenation of the hydrocarbon stream is conducted under the following operating conditions: temperature of catalyst bed 275° C., pressure 30 atm, spatial velocity 1 $hr^{-1}$ expressed as liters of liquid feedstock per liter of catalyst per hour, and a hydrogen flow of about 1000 $Nm^3/h/m^3$ of catalyst. The discharge from the hydrogenation reactor is cooled to ambient temperature and washed with an aqueous sodium hydroxide solution to neutralize the hydrochloric acid produced and is separated into two phases, namely a liquid phase and a gaseous phase. The gaseous phase consists of unreacted hydrogen plus a small quantity of saturated hydrocarbon isomers of butane and pentane, which are easily separated from the hydrogen. A hydrogenated hydrocarbon stream is recovered from the liquid phase and shows a chlorine content of less than 10 ppm and a bromine number practically of zero, and consists essentially of saturated hydrocarbon isomers of pentane and hexane. The hydrodechlorinating activity of the catalyst remains practically unaltered even after about 1000 hours of operation.

EXAMPLE 2

A stream obtained by distilling the effluents of a hydrocarbon resin plant within the temperature range of 0°-95° C., characterised by an organic chlorine content of about 600 ppm by weight and a bromine number of 70 mg/100 g, is fed together with a hydrogen-rich gas stream into a hydrogenation reactor containing a cobalt-molybdenum on $\alpha$-$Al_2O_3$ catalyst produced by Akzo Chemie and previously activated by presulphuration using methods well known in industrial practice. The hydrogenation of the hydrocarbon stream is conducted under the following operating conditions: temperature of catalyst bed 270° C., pressure 30 atm, spatial velocity 1 $hr^{-1}$ expressed as liters of liquid feedstock per liter of catalyst per hour, and a hydrogen flow of about 1000 $Nm^3/h/m^3$ of catalyst. The discharge from the hydrogenation reactor is cooled to ambient temperature, passed through a $ZnCaO_2$ absorption bed to neutralize the hydrochloric acid produced during the hydrogenation, and the gaseous phase is separated from the liquid phase. The gaseous phase consists of unreacted hydrogen plus a small quantity of saturated hydrocarbon isomers of butane and pentane, which are easily recovered. The liquid phase is a hydrogenated mixture consisting essentially of saturated hydrocarbon isomers of pentane and hexane, with a chlorine content of less than 10 ppm and a bromine number practically of zero. The hydrodechlorinating activity of the cobalt-molybdenum catalyst was positively tested over a period of about 50 hours.

EXAMPLE 3

A stream obtained from the effluents originating from a plant producing hydrocarbon resins by the polymerization of a $C_5$+aromatic $C_9$ cut, and characterised by an organic chlorine content of about 300 ppm by weight is fed together with a hydrogen-rich gas stream into a hydrogenation reactor containing a nickel-molybdenum on $\gamma$-$Al_2O_3$ catalyst produced by Sud Chemie A. G. and previously activated by presulphuration using methods well known in industrial practice. The hydrogenation of the hydrocarbon stream is conducted under the following operating conditions: temperature 270° C., pressure 30 atm, spatial velocity 1 $hr^{-1}$ expressed as liters of liquid feedstock per liter of catalyst per hour, and a hydrogen flow of about 1000 $Nm^3/h/m^3$ of catalyst. The discharge from the hydrogenation reactor is cooled to ambient temperature and washed with an aqueous sodium hydroxide solution, and is then separated into two phases. The first, a gaseous phase, consists of unreacted hydrogen plus a small quantity of butane and pentane isomers; the second, a liquid phase from which a hydrocarbon mixture with a chlorine content of less than 10 ppm is recovered, consists essentially of saturated pentane isomers and alkylaromatic $C_9$ hydrocarbons.

We claim:

1. A process for removing organic chlorine from effluents, originating from the separation of hydrocarbon resins, obtained by the polymerization of $C_5$-$C_6$ unsaturated products or $C_5$-$C_9$ unsaturated products, in the presence of $AlCl_3$-based catalysts, consisting of bringing effluent cuts into contact with a preactivated by sulphidins hydrogenation catalyst in a hydrogen atmosphere at a temperature of between 200° and 400° C.

2. A process for removing organic chlorine from effluents originating from the separation of hydrocarbon resins as claimed in claim 1, characterised by conducting the treatment preferably in the presence of a catalyst consisting of nickel-molybdenum supported on gamma alumina.

3. A process for removing organic chlorine from effluents originating from the separation of hydrocarbon resins as claimed in claim 2, characterised by conducting the treatment at a hydrogen pressure of between 5 and 50 atmospheres.

4. A process for removing organic chlorine from effluents originating from the separation of hydrocarbon resins as claimed in claim 2, characterised by conducting the treatment preferably at a temperature of between 250° and 350° C.

5. A process for removing organic chlorine from effluents originating from the separation of hydrocarbon resins as claimed in claim 2, characterised by conducting the treatment at a spatial velocity of 0.1–10 hr$^1$.

6. A process for removing organic chlorine from effluents, originating from the separation of hydrocarbon resins, obtained by the polymerization of $C_5$–$C_6$ or $C_5$–$C_9$ unsaturated products in the presence of $AlCl_3$-based catalysts, consisting of bringing such effluent into contact with a preactivated nickel-molybdenum based catalyst on a gamma-$Al_2O_3$ support and at a pressure of 5 to 50 atmospheres and a temperature of between 250° and 350° C.

7. A process for removing organic chlorine from effluents, originating from the separation of hydrocarbon resins as claimed in claim 6, characterized by treating the effluent in the presence of a catalyst which has been preactivated by sulphiding.

* * * * *